US009922241B2

(12) United States Patent
Li et al.

(10) Patent No.: US 9,922,241 B2
(45) Date of Patent: Mar. 20, 2018

(54) GESTURE RECOGNITION METHOD, AN APPARATUS AND A COMPUTER PROGRAM FOR THE SAME

(75) Inventors: Jiangwei Li, Beijing (CN); Kongqiao Wang, Beijing (CN); Lei Xu, Beijing (CN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/361,372

(22) PCT Filed: Dec. 1, 2011

(86) PCT No.: PCT/CN2011/083298
§ 371 (c)(1),
(2), (4) Date: May 29, 2014

(87) PCT Pub. No.: WO2013/078657
PCT Pub. Date: Jun. 6, 2013

(65) Prior Publication Data
US 2014/0328516 A1    Nov. 6, 2014

(51) Int. Cl.
*G06K 9/00*    (2006.01)
*G06K 9/46*    (2006.01)

(52) U.S. Cl.
CPC ........... *G06K 9/00355* (2013.01); *G06K 9/46* (2013.01); *G06K 9/4642* (2013.01); *G06K 9/4671* (2013.01); *G06K 2009/4666* (2013.01)

(58) Field of Classification Search
CPC .... G06K 9/00355; G06K 9/46; G06K 9/4642; G06K 9/4671; G06K 2009/4666
See application file for complete search history.

(56) References Cited

U.S. PATENT DOCUMENTS

| 6,002,808 A | 12/1999 | Freeman |
| 2005/0281461 A1 | 12/2005 | Farmer et al. |
| 2009/0252413 A1* | 10/2009 | Hua et al. ............... 382/170 |

(Continued)

FOREIGN PATENT DOCUMENTS

| CN | 101093539 A | 12/2007 |
| CN | 101535032 A | 9/2009 |

(Continued)

OTHER PUBLICATIONS

Vladimir I. Pavlovic, Visual Interpretation of Hand Gestures for Human Computer Interaction: A Review, IEEE Pattern Analysis and Machine Intelligence, vol. 19, No. &, Jul. 1997.*

(Continued)

*Primary Examiner* — Stephen R Koziol
*Assistant Examiner* — Pinalben Patel
(74) *Attorney, Agent, or Firm* — Alston & Bird LLP (57) ABSTRACT

The invention concerns a gesture recognition method for gesture-based interaction at an apparatus. The method comprises receiving one or more images of an object; creating feature images for the received one or more images; determining binary values for pixels in corresponding locations of said feature images and concatenating the binary values to form a binary string for said pixel; repeating the previous step for each corresponding pixel of said feature image to form a feature map and forming a histogram representation of the feature map. The invention also concerns an apparatus and a computer program.

20 Claims, 6 Drawing Sheets

(56) References Cited

U.S. PATENT DOCUMENTS

| | | | | |
|---|---|---|---|---|
| 2010/0027892 | A1* | 2/2010 | Guan | G06K 9/00355 382/203 |
| 2010/0172567 | A1* | 7/2010 | Prokoski | A61B 5/0064 382/132 |
| 2011/0135148 | A1 | 6/2011 | Hsiao et al. | |
| 2012/0321140 | A1* | 12/2012 | Xiong | G06K 9/00228 382/108 |
| 2013/0094704 | A1* | 4/2013 | Hamadeh | G06T 7/136 382/103 |
| 2013/0101226 | A1* | 4/2013 | Tang et al. | 382/201 |
| 2013/0121577 | A1* | 5/2013 | Wang et al. | 382/173 |
| 2014/0098191 | A1* | 4/2014 | Rime | H04N 5/2254 348/46 |
| 2014/0193071 | A1* | 7/2014 | Cho | G06K 9/00771 382/170 |

FOREIGN PATENT DOCUMENTS

| | | |
|---|---|---|
| CN | 101536032 A | 9/2009 |
| CN | 101577062 A | 11/2009 |
| CN | 102103409 A | 6/2011 |
| EP | 2 365 420 A2 | 9/2011 |
| WO | WO 2008/053433 A2 | 5/2008 |
| WO | WO 2009/156565 A1 | 12/2009 |

OTHER PUBLICATIONS

Zhao, Guoying, and Matti Pietikainen. "Dynamic texture recognition using local binary patterns with an application to facial expressions." IEEE transactions on pattern analysis and machine intelligence 29.6 (2007).*

O'Hara, Stephen, and Bruce A. Draper. "Introduction to the bag of features paradigm for image classification and retrieval." arXiv preprint arXiv:1101.3354 (2011).*

Chen, Lei, et al. "Face recognition with statistical local binary patterns." Machine Learning and Cybernetics, 2009 International Conference on vol. 4. IEEE, 2009.*

Fu, Xiaofeng, et al. "Spatiotemporal local orientational binary patterns for facial expression recognition from video sequences." Fuzzy Systems and Knowledge Discovery (FSKD), 2012 9th International Conference on. IEEE, 2012.*

Islam, Mohammad Shahidul, Surapong Auwatanamongkol, and Md Zahid Hasan. "Boosting facial expression recognition using LDGP Local Distinctive Gradient Pattern." Electrical Engineering and Information & Communication Technology (ICEEICT), 2014 International Conference on. IEEE, 2014.*

Dubey, Shiv Ram, Satish Kumar Singh, and Rajat Kumar Singh. "Boosting local binary pattern with bag-of-filters for content based image retrieval." Electrical Computer and Electronics (UPCON), 2015 IEEE UP Section Conference on. IEEE, 2015.*

International Search Report and Written Opinion received for corresponding Patent Cooperation Treaty Application No. PCT/CN2011/083298, dated Sep. 13, 2012, 10 pages.

Supplementary European Search Report for Application No. EP 11 87 6828 dated Feb. 4, 2016.

Ahonen, T. et al., *Image Description Using Joint Distribution of Filter Bank Responses*, Pattern Recognition Letters, vol. 30, No. 1 (Mar. 1, 2009) 368-376.

Correa, M. et al., *Real-Time Hand Gesture Recognition for Human Robot Interaction*, Robocup 2009: Robot Soccer World Cup XIII (Feb. 18, 2010) 46-57.

Ding, Y. et al., *Recognition of Hand-Gestures Using Improved Local Binary Pattern*, Multimedia Technology (ICMT), 2011 International Conference on, IEEE, (Jul. 26, 2011) 3171-3174.

Liu, Y. et al., *Hand Gesture Tracking Using Particle Filter With Multiple Features*, Proceedings of the International Symposium on Intelligent Information Systems and Applications (IISA 2009) (Jan. 1, 2009) 264-267.

Office Action and Search Report for Chinese Patent Application No. CN201180076261.6 dated Sep. 9, 2016, with English Summary of Office Action, 10 pages.

Binh, N. D. et al., *Real-Time Hand Tracking and Gesture Recognition System*, GVIP 05 Conference, CICC, Cario, Egypt, Dec. 2005, 7 pages Chen, Q., *Real-Time Vision Based Hand Tracking and Geature Recognition*, Thesis, University of Ottawa(2008) 117 pages.

Dalal, N. et al., *Histograms of Oriented Gradients for Human Detection*, International Conference on Computer Vision and Pattern Recognition, (2005) 8 pages.

Fang, Y. et al., *A Real-time Hand Gesture Recognition Method*, IEEE International Conference on Multimedia and Expo (2007) 995-998.

Kolsch, M. et al., *Robust Hand Detection*, IEEE International Conference on Automat Face and Gesture Recognition (2004) 6 pages.

Kong, A. et al., *Three Measures for Secure Palmprint Identification*, University of Waterloo (2007) 24 pages.

Nguyen, T. T. et al., *An Active Boosting-Based Learning Framework for Real-Time Hand Detection*, IEEE International Conference on Automatic Face and Gesture Recognition (2008) 6 pages.

Ong, E. et al. *A Boosted Classifier Tree for Hand Shape Detection*, IEEE International Conference on Automatic Face and Gesture Recognition (2004) 6 pages.

Wang, C. et al., *Hand Posture Recognition Using Adaboost With SIFT for Human Robot Interaction*, LNCIS 370 (2008 ) 317-329.

Gesturetek II Technology Patent Licensing [online][retrieved Aug. 31, 2015]. Retrieved from the Internet: <URL: http://www.gesturetek.com/products/technologyandlicensing.php>. (undated) 2 pages.

eyeSight I eyesight I We Make Awesome User Experiences [online] [retrieved Aug. 31, 2015]. Retrieved from the Internet: <URL: http.//www.eyesight-tech.com/>. (undated) 3 pages.

Xbox Kinect I Full Body Gaming and Voice Control [online] [retrieved Aug. 31, 2015]. Retrieved from the Internet: <URL: https://web.archive.org/web/20141013080702/http://www.xbox.com/en-US/kinect>.(dated 2014 ) 3 pages.

Office Action and Search Report for Chinese Patent Application No. CN201180076261.6 dated Aug. 9, 2016, with English Summary of Office Action, 10 pages.

Office Action for Chinese Application No. 2011800762616 dated Jan. 22, 2017.

Office Action for European Patent Application No. 11876828.2 dated Apr. 6, 2017, 5 pages.

Office Action for Chinese Application No. 2011800762616 dated Jul. 4, 2017, with English summary, 10 pages.

* cited by examiner

GESTURE RECOGNITION METHOD, AN APPARATUS AND A COMPUTER PROGRAM FOR THE SAME

RELATED APPLICATION

This application was originally filed as Patent Cooperation Treaty Application No. PCT/CN2011/083298 filed Dec. 1, 2011.

TECHNICAL FIELD

The present invention relates generally to gesture-based interaction, and particularly to a gesture recognition method, an apparatus and a computer program.

BACKGROUND

Gesture recognition is a technical method for interpreting human gestures. One of the main areas in gesture recognition is a hand gesture recognition. This technology makes it possible for a human to communicate with a computerized devices without technical means. As a result of this, the computerized device may begin to understand human body language. Some user interfaces are developed to operate according to hand gestures. For example, mobile user interface technology is evolving towards free hand gesture tracking and to gesture enhanced NED (Near-to-Eye Display). However, current hand gesture tracking and recognition methods are not completely reliable and/or the recognition performance depends heavily on multiple and expensive input devices.

There is, therefore, a need for a gesture recognition solution that is both robust and utilizes low-priced accessories.

SUMMARY

Now there has been invented an improved method and technical equipment implementing the method for gesture recognition. Various aspects of the invention include a method, an apparatus and a computer program, which are characterized by what is stated in the independent claims. Various embodiments of the invention are disclosed in the dependent claims.

According to a first aspect, there is provided a gesture recognition method for gesture-based interaction at an apparatus, comprising receiving one or more images of an object, creating feature images for the received one or more images, determining binary values for pixels in corresponding locations of said feature images and concatenating the binary values to form a binary string for said pixel, repeating the previous step for each corresponding pixel of said feature image to form a feature map, forming a histogram representation of the feature map.

According to an embodiment, the received one or more images are captured by an infrared sensor.

According to an embodiment, the received one or more images are captured by a camera sensor.

According to an embodiment, the received one or more images is an image of a hand.

According to an embodiment, the method further comprises using multiple features extractors for determining a shape of the object and for creating the feature images.

According to an embodiment, the method further comprises acquiring binary values from at least two feature images to each image location to compose a binary string for the image location in question.

According to an embodiment, the method further comprises converting the binary string of each corresponding pixel to an integer value.

According to an embodiment, the method further comprises dividing the feature map into blocks and performing a histogram statistics for each block.

According to an embodiment, the method further comprises concatenating histograms of all blocks into a long feature vector to represent an image of the object.

According to an embodiment, the received image is a video frame.

According to a second aspect, there is provided an apparatus comprising a processor, memory including computer program code, the memory and the computer program code configured to, with the processor, cause the apparatus to perform at least the following: receiving one or more images of an object; creating feature images for the received one or more images; determining binary values for pixels in corresponding locations of said feature images and concatenating the binary values to form a binary string for said pixel; repeating the previous step for each corresponding pixel of said feature image to form a feature map; forming a histogram representation of the feature map.

According to an embodiment, the apparatus comprises an infrared sensor configured to capture said one or more images.

According to an embodiment, the apparatus comprises a camera sensor configured to capture said one or more images.

According to an embodiment, the received one or more images is an image of a hand.

According to an embodiment, the computer program code is further configured to, with the processor, cause the apparatus to perform using multiple feature extractors for determining a shape of the object and for creating the feature images.

According to an embodiment, the computer program code is further configured to, with the processor, cause the apparatus to perform acquiring binary values from at least two feature images to each image location to compose a binary string for the image location in question.

According to an embodiment, the computer program code is further configured to, with the processor, cause the apparatus to perform converting the binary string of each corresponding pixel to an integer value.

According to an embodiment, the computer program code is further configured to, with the processor, cause the apparatus to perform dividing the feature map into blocks and performing a histogram statistics for each block.

According to an embodiment, the computer program code is further configured to, with the processor, cause the apparatus to perform concatenating histograms of all blocks into a long feature vector to represent an image of the object.

According to an embodiment, the computer program code is further configured to, with the processor, cause the apparatus to perform the received image is a video frame.

According to a third aspect, there is provided an apparatus comprising processing means, memory means including computer program code, the apparatus further comprising receiving means configured to receive one or more images of an object; creating means configured to create feature images for the received one or more images; determining means configured to determine binary values for pixels in corresponding locations of said feature images and concatenating the binary values to form a binary string for said pixel; repeating means configured to repeat the previous step for each corresponding pixel of said feature image to form a feature map; forming means configured to form a histogram representation of the feature map.

According to a fourth aspect, there is provided a computer program embodied on a non-transitory computer readable medium, the computer program comprising instructions causing, when executed on at least one processor, at least one apparatus to: receive one or more images of an object; create feature images for the received one or more images; determine binary values for pixels in corresponding locations of said feature images and concatenating the binary values to form a binary string for said pixel; repeat the previous step for each corresponding pixel of said feature image to form a feature map; form a histogram representation of the feature map.

DESCRIPTION OF THE DRAWINGS

In the following, various embodiments of the invention will be described in more detail with reference to the appended drawings, in which.

DETAILED DESCRIPTION OF THE EMBODIMENTS

In the following, several embodiments of the invention will be described in the context of Home TV gesture user interface (being used e.g. in kinetic game consoles). It is to be noted, however, that the invention is not limited to Home TV gesture user interface. In fact, the different embodiments have applications widely in any environment where gesture recognition technology is needed. Examples of various applications include handheld projectors (a.k.a. Pico-projector embedded devices), near-to-eye displays (NED) and mobile device's user interface that utilizes gesture recognition for interaction.

Figure 1A:
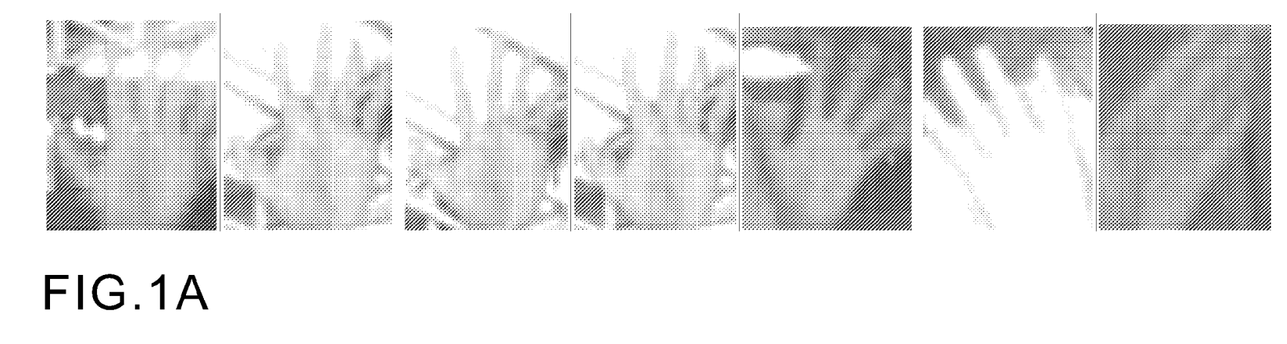
FIG. 1A shows a series of hand palm images captured by infrared sensors.
Figure 1B:
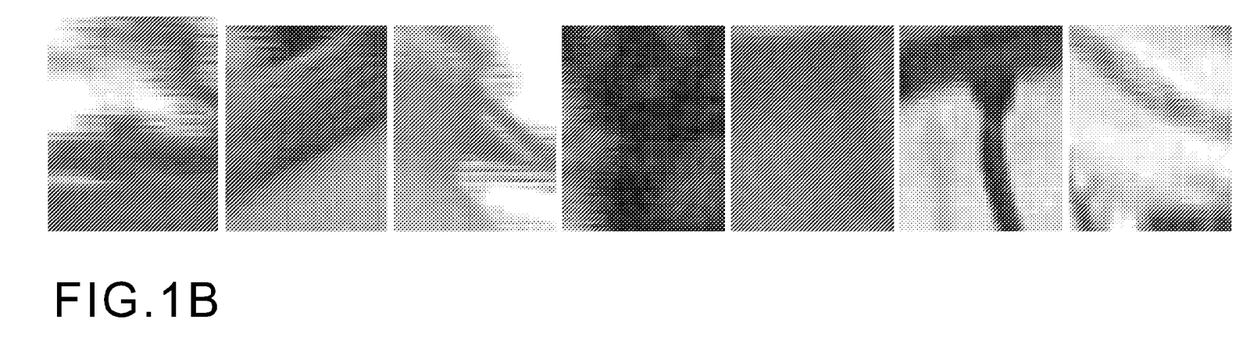
FIG. 1B shows a series of background images captured by infrared sensors.

It is realized that free hand recognition has several challenges to be overcome. For example, most hand palm images (later called as "palm images") have low contrast and poor textures when captured with low-power infrared sensors. Examples of palm and background images taken by IR sensors are shown in FIGS. 1A and 1B respectively. FIG. 1A illustrates a series of palm images, and FIG. 1B illustrates a series of background images. It is realized from images of FIG. 1A, that a palm (i.e. a hand having fingers) is a non-rigid and articulated object, which contains rich in-plane and out-of-plane rotations. In addition, there is noise on edges of the palms. Further, the appearances of some background images (see FIG. 1B) are quite similar to those of the palms (FIG. 1A). With these challenges, the realization of high performance palm recognition is more difficult than other object recognition.

The present solution aims to provide a fast but accurate multiple hand palm tracking method for free gesture interaction. The solution proposes a robust local shape descriptor for Structure Coding from Features Extractors (SCFE) to describe palms. This may employ a three-stage framework to infer binary codes to encode edge atoms: 1) shape feature extractors with low computation cost are designed for various shape structure extraction; 2) tensor based binary string features may be computed by concatenating all binary bits along feature images acquired by applying selected features extractors on original palm images; 3) histogram models are configured to encode palm spatial distribution for discriminative hand tracking.

Compared to other feature extraction methods, SCFE is more advantageous since it enables very flexible binary coding and is capable of strong shape or texture description. In addition to hand palm tracking, SCFE can be generalized for detection or recognition of other objects as well. Therefore the present solution is not limited solely to hand gesture recognition method.

The algorithm for palm detection and tracking according to the present solution is fast enough to be run on a mobile platform and has also robust performance under various conditions. As some image may be of low contrast and has weak micro textures (as shown in FIG. 1) the algorithm needs to focus on extracting macro-textures, such edges, for high performance detection.

Figure 2:
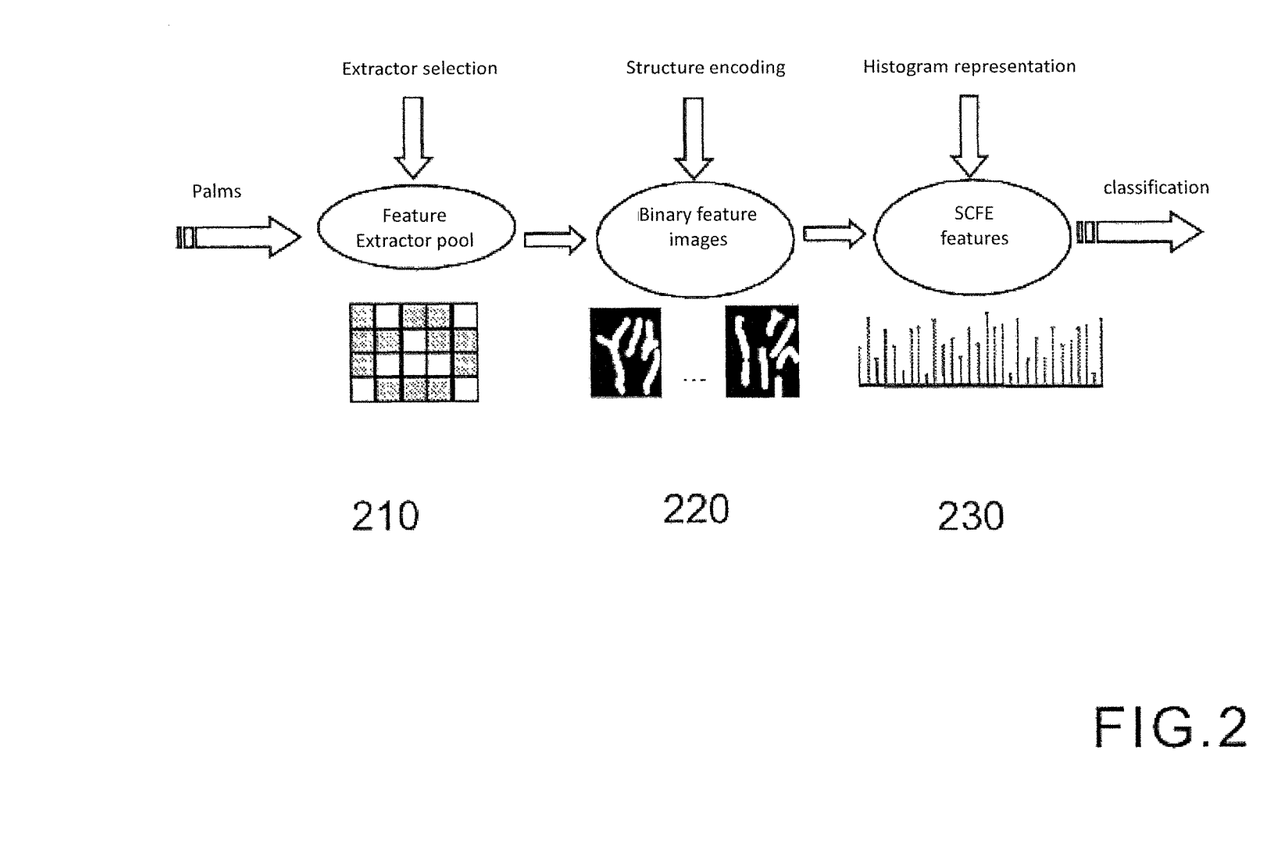
FIG. 2 shows an embodiment of a gesture recognition method according to the present solution.

An overview of the method according to an embodiment is shown in FIG. 2 that illustrates a SCFE feature based hand palm tracking. At first, one or more palm images are received (200). In addition to still images, "an image" may refer a frame of a video, whereby each video frame can be processed according to the present solution. The palm image could have been captured with a conventional, low-priced IR camera. After this, a large scale of feature extractors is collected to form a pool (210) and each one is capable of extracting some edge atoms. Then a relatively small set of extractors are selected from the pool and applied on palm images for binary coding. This generates multiple feature images. The feature images are put together inside a three-dimensional space and features in the same two-dimensional position are concatenated to form SCFE binary strings (220). The number of feature images being used can vary from a couple of feature images to all feature images, but the optimal result can be achieved with 6-12 feature images. Finally, histogram representation (230) is employed to code spatial information for better palm tracking.

In the following the palm tracking method steps (210-230) are described in more detailed manner.
Shape Description with Designed Extractor Pool (FIG. 2: 210)

Palm images that have been captured by an infrared sensor typically does not have enough micro textures. The most useful discriminative information inside the palm images are macro structures, such as edges. The purpose of the extractor pool is to collect all kinds of and as many as possible local structure extractors, so that shapes or other textures can be fully obtained.

Figure 3:
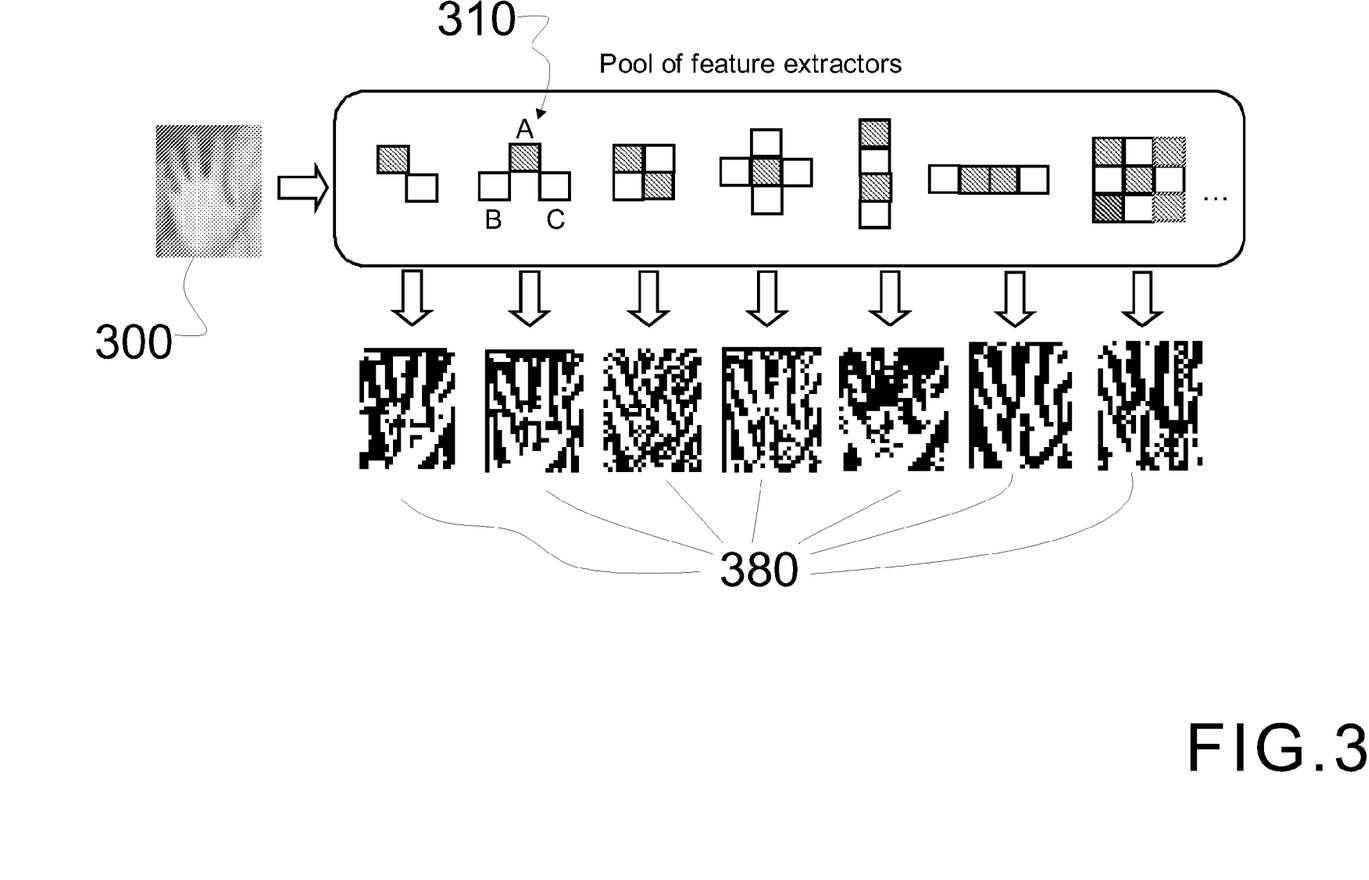
FIG. 3 shows an embodiment of a feature extraction relating to the gesture recognition method.

FIG. 3 is a representation of a feature extractors pool for palm feature extraction from a palm image (300). The pool may contain various kinds of image filters, for example Harr-like, Gabor, etc. or any other filter that is designed for the purpose of gathering specific shape contour of palms. FIG. 3 only lists seven extractors from the pool, each of which is capable of extracting features within specific information channel. The extractor may compare the gray sum of image blocks labeled by the red rectangles (hatch-filled blocks in FIG. 3) with those labeled by blue colour (unfilled blocks in FIG. 3), and correspondingly returns binary bits of one or zero based on their relative magnitudes. The general requirements of an eligible feature extractor are:

1) The extractor should be computed on image blocks to avoid the generation of noise features. Image qualities are quite low and there are no delicate structures as palm-prints inside the palms, whereby shape information is the most valuable for palm detection. Image block based filters meet the requirements of detecting shape structures.

2) The extractor should have differential forms to be an edge filter. For example, if the numbers of red blocks (hatch-filled blocks in FIG. 3) and blue blocks (unfilled blocks in FIG. 3) are not equal, as in comparison of two sums in feature computation, both of them should be multiplied by appropriate coefficients to meet the requirement of differential computation. For example, the second extractor (310) in FIG. 3 is an asymmetric operator. There is one red (hatch-filled) block A and two blue (unfilled) blocks B and C. The differential computation with this extractor is $T(H_1*A-H_2*B-H_3*C \geq 0)$, where $T(\cdot)$ is a Boolean operator and $H_1=H_2+H_3$.

With the pool of feature extractors with symmetric or asymmetric forms, multiple feature images (380) can be generated as shown in FIG. 3. Each of them illustrates peculiar edge structures. Intuitively, the edges in feature maps are complementary and the combination of them should be helpful to improve the accuracy of palm detection in low quality images.

Tensor Based Feature Encoding from Feature Images

Figure 4:
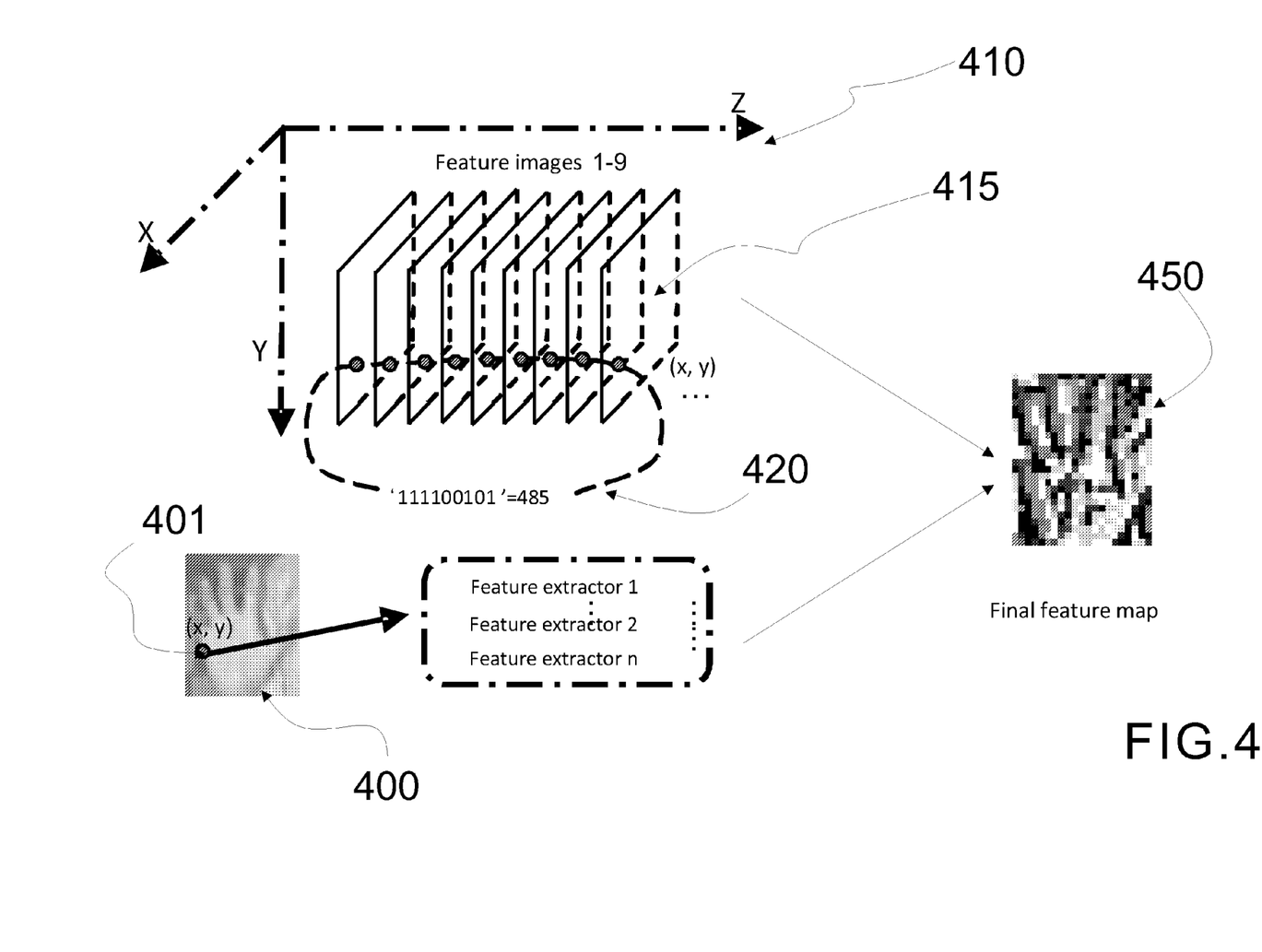
FIG. 4 shows an embodiment of binary coding of feature images relating to the gesture recognition method.

Each pixel (401) inside any palm image (400) may contain edge information and the design of feature extractor pool could provide them adequately. Any generated feature image encodes peculiar edge distribution denoted by one and zero binary values, which indicate a corresponding edge structure within the surrounding area. It is expected that the combination of all such structures is helpful to hand palm detection. Here, the tensor based strategy is employed to effectively encode all the feature maps.

The feature images are sequentially listed in a three-dimensional space (410) as shown in FIG. 4 and all of them are placed with the same X and Y coordinates but with different Z coordinates. This actions forms a tensor and the height of Z axis is determined by the number of feature images (415) being resulted from a feature extractor method of FIG. 3. To each image location (X, Y), the binary values are acquired from all feature images (415) one by one to compose a binary string. In FIG. 4 it is supposed that the binary features (420) at (X, Y) from the first feature image to the ninth feature image (415) are "1, 1, 1, 1, 0, 0, 1, 0, 1", respectively, whereby it forms a binary string "111100101" (420) which can then be converted to an integer "485" for better feature representation purpose. Since for each pixel, the corresponding binary string and its integer representation can be obtained, it can comprise a new feature map (450) as shown in FIG. 4 and its appearance has some similarities with the real palm. The main difference lie in that the final feature map enables noise and high frequency component exclusion from the original palm image and just keeps useful edge structures for discrimination.

The mechanism of tensor based binary string encoding can be explained from a different perspective. As shown in FIG. 4, since a binary value is acquired by applying one feature extractor on the original image, the extraction of binary string feature can be achieved by binary bit compu-tation one by one with the selected feature extractors on the same image position. It could generate the same final feature map as tensor based computation.

Both the length of binary strings and their integer representation are determined by how many feature extractors are used for palm encoding. If the number of selected feature extractors is too few, it cannot provide macro structures as adequately as possible. And if the number is huge, it will encode too much redundant information and result in very sparse features distribution. In palm detection, the application of 6-12 feature extractors is good to achieve satisfying performance.

Histogram Representation and its Performance

Although SCFE can extract macro structures from hands, it would be better to use histogram statistics to further improve the capability of tolerating noises and partial alignment errors. Further, to use spatial information, the final features map can be divided into J blocks, and for each block $p_j(1 \leq j \leq J)$, histogram statistics can be performed within it to count the occurrence of each SCFE pattern, so the histogram features $h_j$ can be generated. Then, histograms of all blocks can be concatenated into a long feature vector $H_i=\{h_1, h_2, \ldots, h_J\}$ to represent a palm image. In hand palm detection, all candidates are compared with the templates stored beforehand, and if the distance between the current window and any of the templates is small enough, it will be classified as a palm, else it will be classified a background image.

Figure 5A:
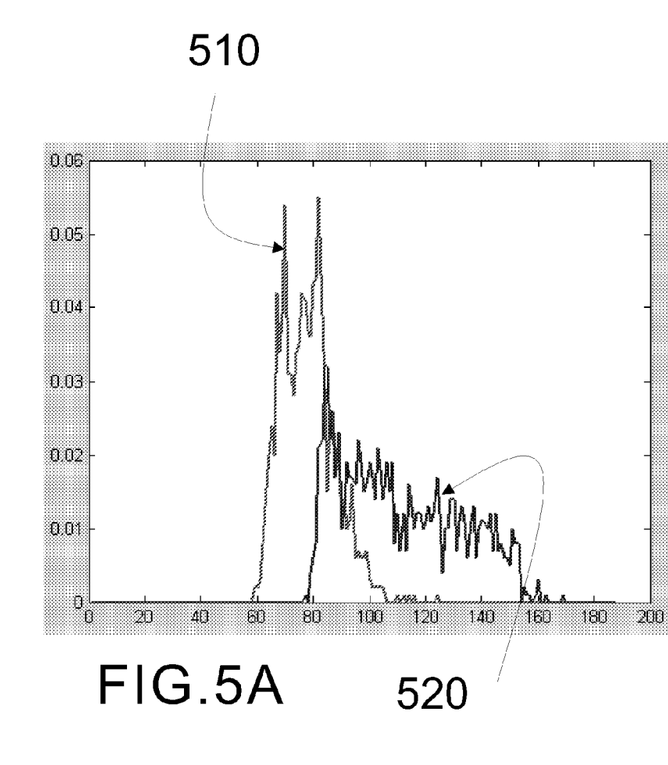
FIG. 5A shows testing result with HOG feature.
Figure 5B:
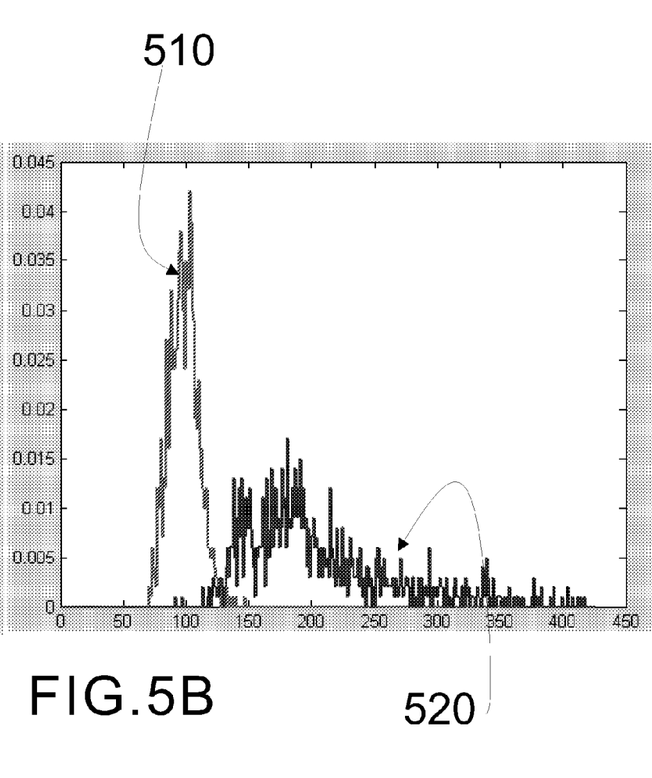
FIG. 5B shows testing result with SCFE feature.

FIGS. 5A-B illustrate comparing the distance score distributions by applying two different feature extraction methods of HOG (Histogram of Oriented Gradients) (FIG. 5A) and SCFE (FIG. 5B). The experimental database is composed of 1000 positive hand palms and 1000 negative background patches and some of them have been shown in FIG. 1. The gallery only stores one palm template for similarity evaluation. In FIGS. 5A-5B the first line (510) denotes the distance probability distribution of positive samples, and the second line (520) denotes that of negative samples. Obviously, the discrimination performance of SCFE depicted by FIG. 5B is much better than in FIG. 5A depicting HOG. In FIG. 5B, there exists very few overlapping between two probabilistic curves, which means the classification of palms and backgrounds is easy given appropriate parameters. K-L (Kullback-Leibler) divergence can be computed to evaluate the similarities between two probabilistic distributions. The K-L divergence values of both cases are 0.5973 and 0.2253, respectively. It demonstrates that the SCFE feature has stronger classification capability compared to HOG. Further, since the computation of SCFE feature only involves image filtering operations with block based feature extractors, it should run very fast even on mobile platforms by using the integral image technique.

It is realized that SCFE can encode macro structures such as palm edges for discriminative hand tracking. With another selected feature extractors, it enables detecting micro structures like skin textures as well. With block based feature extractors, the SCFE feature extraction can be very fast to be performed even on mobile platform. The method can be generalized to other object categories for robust and fast detection and tracking.

Figure 6:
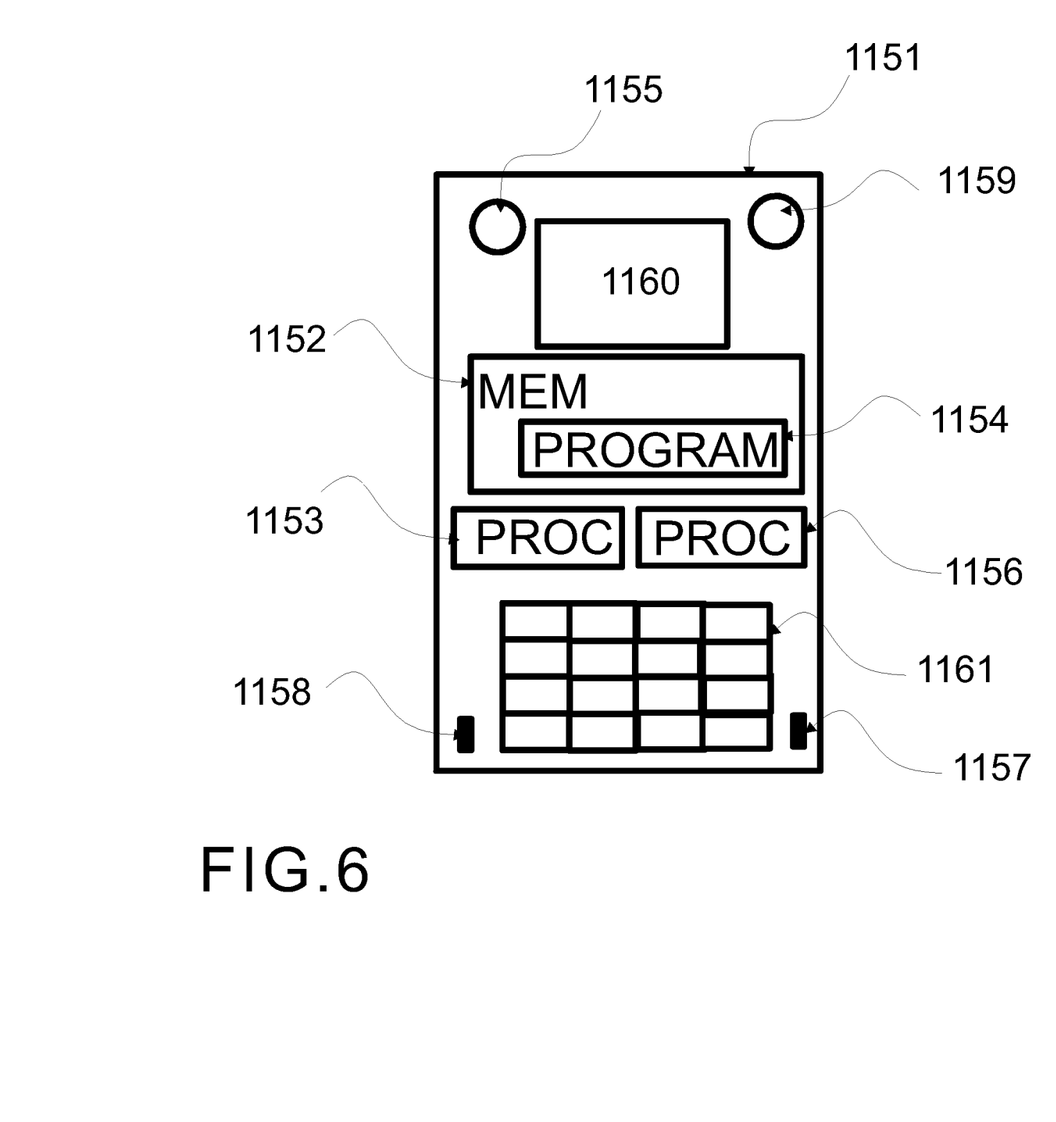
FIG. 6 shows an example of an electronic device.

FIG. 6 shows an example of an apparatus for carrying out the gesture recognition method. As shown in FIG. 6, the apparatus 1151 contains memory 1152, at least one processor 1153 and 1156, and computer program code 1154 residing in the memory 1152. The apparatus may also have one or more cameras 1155 and 1159 for capturing image data, for example stereo video. The apparatus may also contain one, two or more microphones 1157 and 1158 for capturing sound. The apparatus may also comprise a display 1160. The apparatus 1151 may also comprise an interface means (e.g., a user Interface) which may allow a user to interact with the device. The user interface means may be implemented using a display 1160, a keypad 1161, voice control, gesture recognition or other structures. The apparatus may also be connected to another device e.g. by means of a communication block (not shown in FIG. 6) able to receive and/or transmit information. It needs to be understood that different embodiments of the apparatus allow different parts to be carried out in different elements. The various embodiments of the invention can be implemented with the help of computer program code that resides in a memory and causes the relevant apparatus to carry out the invention. For example, a device may comprise circuitry and electronics for handling, receiving and transmitting data, computer program code in a memory, and a processor that, when running the computer program code, causes the I device to carry out the features of an embodiment.

In other words, the various elements of the apparatus comprise processing means and memory means including computer program code. The apparatus further comprises receiving means configured to receive an image of an object, creating means configured to create multiple feature images for the received image, determining means configured to determine binary values for pixels in corresponding locations of said feature images and concatenating the binary values to form a binary string for said pixel, repeating means configured to repeat the previous step for each corresponding pixel of said feature image to form a feature map, and forming means configured to form a histogram representation of the feature map.

Similarly, the apparatus comprises means for using multiple features extractors for determining a shape of the object and for creating multiple feature images. Similarly, the apparatus comprises means for acquiring binary values from all feature images to each image location to compose a binary string for the image location in question. Further, the apparatus comprises means for converting the binary string of each corresponding pixel to an integer value. Yet further the apparatus comprises means for dividing the feature map into blocks and performing a histogram statistics for each block. Yet further, the apparatus comprises means for concatenating histograms of all blocks into a long feature vector to represent an image of the object.

The multiple hand palm tracking method represents a substantial advancement in the gesture recognition technology as to its fastness and accurateness. The solution employs a robust local shape descriptor for structure coding from feature extractors (SCFE) to describe palms. The solution also provides a three-stage framework to infer binary codes to encode edge atoms. A large scale of features extractors are collected to form a pool. A small set of extractors are selected from this pool and applied on palm images for binary coding to get multiple features images. All these feature images are put together inside a three-dimensional space and features in the same two-dimensional position are concatenated to form SCFE binary strings. Finally, histogram representation is employed to code spatial information for better hand palm tracking.

It is obvious that the present invention is not limited solely to the above-presented embodiments, but it can be modified within the scope of the appended claims.

What is claimed is:

1. A method comprising:
   receiving one or more images of an object,
   creating feature images for the received one or more images,
   determining binary values for pixels in corresponding locations of said feature images and concatenating the binary values to form a binary string for said pixel,
   repeating the previous determination of binary values for each corresponding pixel of said feature image to form a feature map, and
   forming a histogram representation of the feature map.

2. The method of claim 1, wherein the received one or more images are captured by an infrared sensor.

3. The method of claim 1, wherein the received one or more images are captured by a camera sensor.

4. The method of claim 1, wherein the received one or more images is an image of a hand.

5. The method of claim 1, further comprising:
   using multiple features extractors for determining a shape of the object and for creating the feature images.

6. The method of claim 1, further comprising:
   acquiring binary values from at least two feature images to each image location to compose a binary string for the image location in question.

7. The method of claim 1, further comprising one of:
   converting the binary string of each corresponding pixel to an integer value and
   dividing the feature map into blocks and performing a histogram statistics for each block.

8. The method of claim 7, further comprising:
   concatenating histograms of all blocks into a long feature vector to represent an image of the object.

9. The method of claim 1, wherein the received image is a video frame.

10. An apparatus comprising a processor, and memory including computer program code, the memory and the computer program code configured to, with the processor, cause the apparatus to perform at least the following:
    receive one or more images of an object,
    create feature images for the received one or more images,
    determine binary values for each of a plurality of pixels in corresponding locations of said feature images and concatenating the binary values to form a binary string for each respective pixel,
    incorporate each of the binary values for each corresponding pixel of said feature image to form a feature map
    form a histogram representation of the feature map representative of spatial distribution features of the one or more images; and
    compare each histogram representation to stored histogram representations to determine whether each histogram representation is associated with an object type or a background.

11. The apparatus of claim 10, comprising an infrared sensor configured to capture said one or more images.

12. The apparatus of claim 10, wherein the received one or more images is an image of a hand.

13. The apparatus of claim 10, wherein the computer program code is further configured to, with the processor, cause the apparatus to perform
    use multiple features extractors for determining a shape of the object and for creating the feature images.

14. The apparatus of claim 10, wherein the computer program code is further configured to, with the processor, cause the apparatus to perform
    acquire binary values from at least two feature images to each image location to compose a binary string for the image location in question.

15. The apparatus of claim 10, wherein the computer program code is further configured to, with the processor, cause the apparatus to perform:
   convert the binary string of each corresponding pixel to an integer value.

16. The apparatus of claim 10, wherein the computer program code is further configured to, with the processor, cause the apparatus to perform
   divide the feature map into blocks and performing a histogram statistics for each block.

17. The apparatus of claim 16, wherein the computer program code is further configured to, with the processor, cause the apparatus to perform
   concatenate histograms of all blocks into a long feature vector to represent an image of the object.

18. The apparatus of claim 10, wherein the received image is a video frame.

19. A computer program product comprising a non-transitory computer readable medium and a computer program embodied thereon, the computer program comprising instructions causing, when executed on at least one processor, at least one apparatus to:
   receive one or more images of an object,
   create feature images for the received one or more images,
   determine binary values for each of a plurality of pixels in corresponding locations of said feature images and concatenating the binary values to form a binary string for each respective pixel,
   incorporate each of the binary values for each corresponding pixel of said feature image to form a feature map,
   form a histogram representation of the feature map representative of spatial distribution features of the one or more images; and
   compare each histogram representation to stored histogram representations to determine whether each histogram representation is associated with an object type or a background.

20. The method of claim 1, wherein the histogram representation of the feature map reflects reduced noise and reduced frequency relative to the one or more images.

* * * * *

UNITED STATES PATENT AND TRADEMARK OFFICE
CERTIFICATE OF CORRECTION

PATENT NO. : 9,922,241 B2
APPLICATION NO. : 14/361372
DATED : March 20, 2018
INVENTOR(S) : Li et al.

It is certified that error appears in the above-identified patent and that said Letters Patent is hereby corrected as shown below:

In the Claims

In Claim 1, Column 8, Line 6:
After for insert --each of a plurality of--

In Claim 1, Column 8, Line 8:
Delete "said" and insert --each respective--

In Claim 1, Column 8, Line 9:
Delete "repeating the previous determination" and insert --incorporating each--

In Claim 1, Column 8, Line 9:
After of insert --the--

In Claim 1, Column 8, Line 11:
After map delete ", and" Insert --;--

In Claim 1, Column 8, Line 12:
After map delete "." and insert --representative of spatial distribution features of the one or more images; and comparing each histogram representation to stored histogram representation to determine whether each histogram representation is associated with an object type or a background.--

Signed and Sealed this
Fourth Day of June, 2019

Andrei Iancu
*Director of the United States Patent and Trademark Office*